United States Patent [19]
Von Haas

[11] Patent Number: 5,642,651
[45] Date of Patent: Jul. 1, 1997

[54] MODULAR TOOL SYSTEM

[75] Inventor: Rainer Von Haas, Geesthacht, Germany

[73] Assignee: Widia GmbH, Essen, Germany

[21] Appl. No.: 532,637

[22] PCT Filed: Mar. 11, 1994

[86] PCT No.: PCT/DE94/00272

§ 371 Date: Oct. 30, 1995

§ 102(e) Date: Oct. 30, 1995

[87] PCT Pub. No.: WO94/22623

PCT Pub. Date: Oct. 13, 1994

[30] Foreign Application Priority Data

Apr. 5, 1993 [DE] Germany .......................... 43 11 109.2

[51] Int. Cl.⁶ .................. B23B 29/03; B23B 29/08
[52] U.S. Cl. .................. 82/152; 407/76; 407/86; 407/93
[58] Field of Search .................. 82/1.2, 158; 407/76, 407/86–88, 93, 94, 98; 408/153, 181; 409/232

[56] References Cited

U.S. PATENT DOCUMENTS 3,202,433  8/1965  Davis .................. 409/232

FOREIGN PATENT DOCUMENTS

| 0 175 011 | 3/1986 | European Pat. Off. . | |
| 0 257 005 | 2/1988 | European Pat. Off. . | |
| 0 300 544 B1 | 1/1989 | European Pat. Off. . | |
| 283096 | 10/1990 | German Dem. Rep. | 409/232 |
| 16 27 012 C3 | 7/1971 | Germany . | |
| 15 52 484 C3 | 7/1975 | Germany . | |
| 26 25 983 A1 | 12/1977 | Germany . | |
| 36 22 638 A1 | 3/1987 | Germany . | |
| 37 02 268 C2 | 8/1988 | Germany . | |
| 60-219508 A | 12/1985 | Japan . | |
| 351158 | 2/1961 | Switzerland . | |
| 358095 | 12/1972 | U.S.S.R. . | |
| 90/14187 | 11/1990 | WIPO | 82/158 |

*Primary Examiner*—M. Rachuba
*Assistant Examiner*—Kenneth S. Hansen
*Attorney, Agent, or Firm*—Herbert Dubno; Yuri Kateshov

[57] ABSTRACT

The invention relates to a modular tool system consisting of a tool holder (10) with a fitting for a cutting insert holder (11) which, when released, is radially movable in relation to the tool holder by means of an adjusting screw (17) fitted in a threaded hole (16) in one of the holders and can be clamped with the tool holder by means of clamping screws (15). To provide an alternative radial adjustment of the tools or centred fitting without facilities for readjustment without a great deal of effort, the stop is a pin (18, 30) releasably securable in the holder, whereby at least one diameter of the pin is the same as that of the pin recess in the other holder and the blind hole in the first holder (20, 29), into which the projecting end of the pin enters and the hold for the adjusting screw opens perpendicularly thereto.

10 Claims, 5 Drawing Sheets

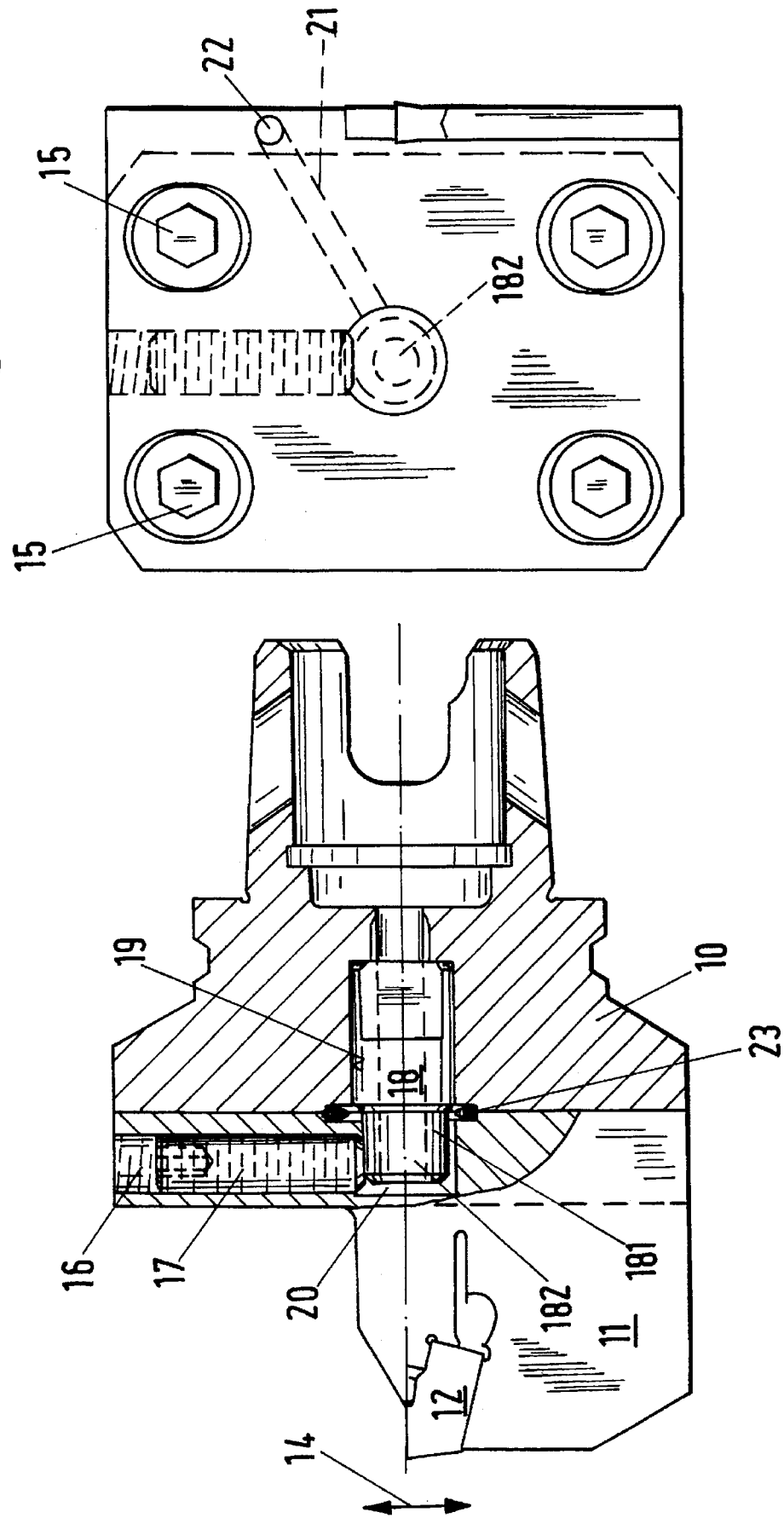

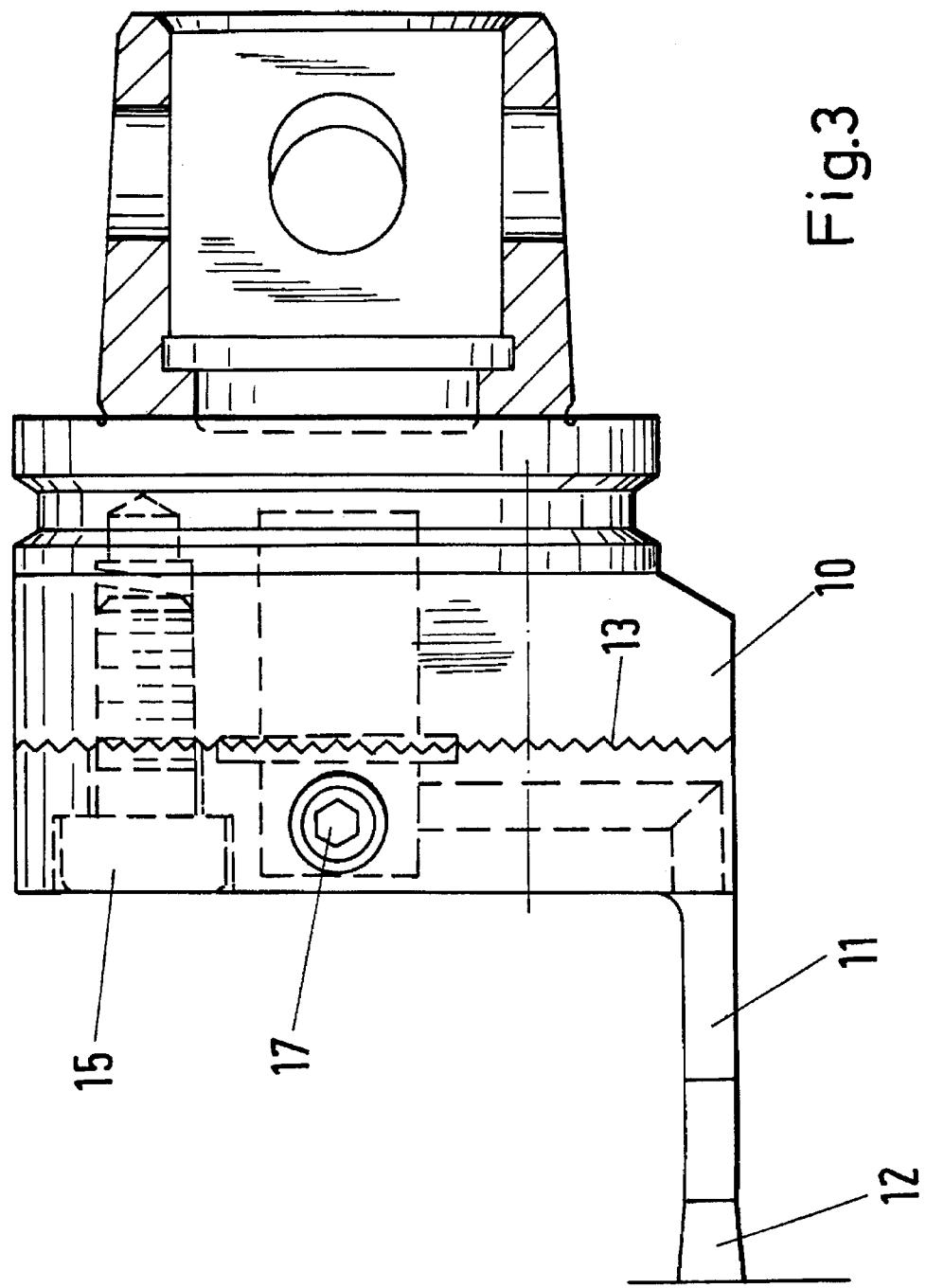

MODULAR TOOL SYSTEM

CROSS REFERENCE TO RELATED APPLICATIONS

This application is the US national phase of PCT application PCT/DE94/00272 filed 11 Mar. 1994 with a claim to the priority of German application P 43 11 109.2 itself filed 5 Apr. 1993 under the International Convention.

FIELD OF THE INVENTION

The invention relates to a modular tool system comprising a tool holder with a seat for a cutting-insert holder which when released is radially shiftable relative to the tool holder by means of an adjustment screw fitted in a threaded bore of one of the holders and which is clampable against the tool holder by means of a tightening screw.

BACKGROUND OF THE INVENTION

Such tool systems include for example the bore head described in German 1,627,012 or another tool holder on a drill spindle where the cutting-tool holder is radially movable and is guided by a dovetail rail in a part fixed in a dovetail groove running diametrally in the end of a part fixed on the drill spindle. The dovetail groove has a clamping slit extending from its floor which is traversed by a clamping screw whose actuation leads to an axial alignment of the cutting-tool holder as a result of the flat engagement of the ends of the two parts. The adjustment screw is braced against a pin fixed in the drill spindle.

German 2,625,983 describes a drilling tool with two individually adjustable blades that are guided by means of a serration or other guide formation transverse to the tool axis on a support body and which are fixable thereon by means of clamping screws. Two clamping nuts for the adjustment screws are slidable in a recess of the support body extending transverse to the tool axis parallel to the blade. The clamping screws whose heads engage the blades ride in slots of the support body at an angle to the tool axis toward the clamping nuts.

European 0,175,011 describes a rotatable machining tool, in particular a boring head or the like, with a fine-adjustment screw in the blade carrier which is arranged perpendicular to the clamping screw for the blade carrier and which engages externally on a sleeve which sits on the cylindrical part of the clamping screw. In addition the teeth of the support between the relatively radially shiftable parts are sawtooth-shaped with steep and shallow flanks.

Vertical adjustability is desired even in tap sets in order to get the desired central position. The tap tools for example known from European 0,257,005 and 0,300,455 have one-piece blade-forming blade carriers which are guided between confronting guide surfaces of a tool shaft and which are fixed by means of clamping screws on the tool shaft, but which have no possibility of vertical adjustment.

German 3,622,638 describes a boring head with frontal blades. This bore head has a bore-head body which is connectable with a drill rod and on whose end face is radially shiftably mounted and secured at least one blade carrier provided with a blade which is clampable against an abutment by a clamping screws engaging through a longitudinal slot. This support is a planar surface in which is machined a guide groove extending through the center and in whose longitudinal center is arranged an abutment in which are adjustably guided two positioning screws formed as threaded pins and adjustable longitudinally of the guide groove. The abutment is part of an abutment bolt which is removably mounted in a bore of the bore-head body. The abutment bolt has a flat against which a clamping pin can press which is adjustable in the bore-head body and which presses with its end against a flat of the abutment bolt. This arrangement of the abutment should make it possible that when extreme forces are exerted and the abutment is destroyed the bore head is not damaged but only needs a new abutment bolt.

OBJECT OF THE INVENTION

It is an object of the present invention to improve on a modular tool system of the above-described type, in particular also for taps, so that without substantial manufacturing costs a radial adjustment of the tool or alternatively a centered fixing is possible.

SUMMARY OF THE INVENTION

These objects are attained in the modular tool system according to the invention wherein the abutment is a bolt releasably securable in the holder, at least a diameter of the bolt having the same size as the bolt seat in the other holder and of the blind bore in the first holder into which the projecting bolt end engages and which opens perpendicular to the bore for the adjustment screw. The bolt makes possible a radial shifting of the cutting-insert holder and by using a differently shaped bolt it is also possible to ensure centering between the tool holder and the cutting-insert holder.

The abutment can in particular be a bolt releasably mounted in the holder, on whose one end flats are formed, and which serves with its other smaller-diameter end as an abutment.

The advantage of this system is that the surface of the bolt—as known in principle from the state of the art—can be used as an abutment surface for radial shifting or adjusting. If the bolt is turned around through 180° and inserted with its other end, the projecting end fixes the radially movably guided cutting-insert holder since the bolt fits snugly in the blind bore. The adjustment screw is of course screwed back beforehand so that it does not impede the insertion of the larger-diameter bolt end into the blind bore.

Thus preferably the first holder is a cutting-insert holder and the other holder is the tool holder which itself can be fixed on a tool base holder. Preferably the cutting-insert holder is a clamping block for a tapping tool which is releasably fixed in the clamping slot thereon.

Since it is standard according to the prior art to provide a coolant-feed tube that extends arcuately to the tool shaft or the tool base holder to the cutting plane, according to a further embodiment of the invention the coolant feed is integrated into the tool holder (cutting-insert holder) in that the coolant is fed through the bolt as well as through coolant passages leading to the cutting insert. The bolt is to this end provided with a central passage through which the coolant flows to the front region of the blind bore of the cutting insert whence it flows through a coolant passage to the cutting insert. This coolant path is substantially better protected than the external coolant conduit according to the prior art.

Preferably the cutting-insert holder clampable on a toothed support surface is provided on a back side turned away from the tool with a centering pin and clamping-screw arrangements dimensioned according to the size and type of tool so as to accurately establish the position of the cutting-insert holder relative to the tool holder. In this way it is easy to determine during mass production if the proper tool for the machining is fitted on the tool holder. Monitoring can be done for example by feelers in the tool holder or similar means.

BRIEF DESCRIPTION OF THE DRAWING

Embodiments of the invention are shown in the drawing. Therein:

FIG. 1 shows a partial section through a tool holder with a cutting insert holder;

FIG. 2 is a side view of the embodiment of FIG. 1; and

FIG. 3 is a top view of the same embodiment shown without bolts;

SPECIFIC DESCRIPTION

Figure 5:
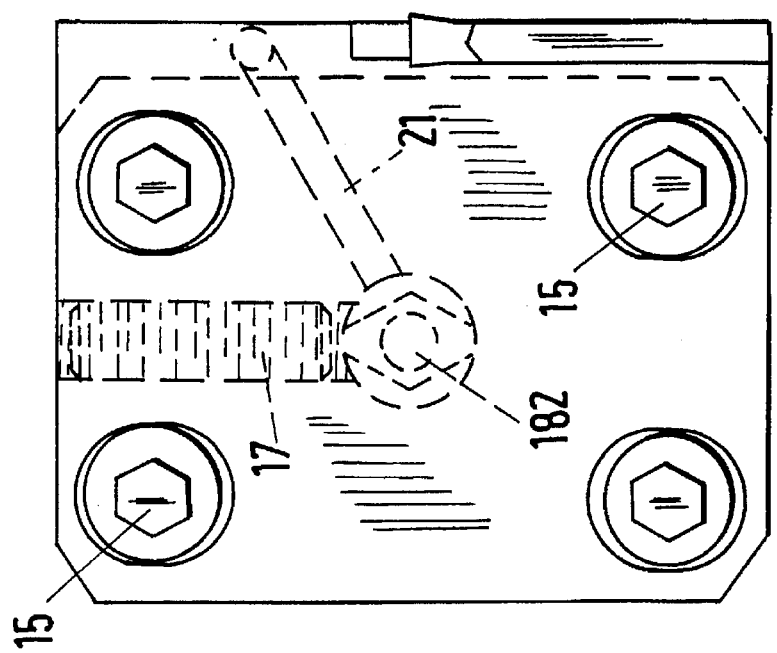
FIGS. 4 and 5 are views corresponding to FIGS. 1 and 2 with a bolt rotated 180°.

A tool system according to the invention includes a base tool holder which can for example also be a revolver disk, a tool holder 10 that is fixable on the base holder, a cutting-insert holder 11 which in the present case serves as a clamping block for the cutting insert 12. The end coupling part between the tool holder 10 and the cutting-insert holder 11 has toothed interengaging surfaces (see FIG. 3) so that the cutting-insert holder 11 together with the clamped cutting insert 12 is adjustable vertically in the direction of the double arrow 14 when the clamping screw 15 (see FIGS. 2 and 3) is loosened. As already known from the prior art, the cutting-insert holder has a threaded bore 16 in which an adjustment screw 17 is set and by means of which it is also possible to adjust the vertical position of the tool according to FIGS. 1 through 3. The adjustment screw 17 is braced on a first end 181 of a bolt 18 which is snugly received in a bore 19 of the tool holder 10. The front end of the bolt 18 extends into a blind bore 20 of the cutting-insert holder 11 whose diameter is the same as the diameter of the bore 19 of the tool holder 10. As a result of the smaller diameter of the front end 181 when the adjustment screw 17 is used the cutting-insert holder is shifted vertically through the remaining play. The bolt 18 furthermore has a central throughgoing passage 182 through which a coolant is circulated to flow out through a further passage 21 in the cutting-insert holder and through a further passage 22 to the machining location. The passage connections are sealed by O-rings 23.

Figure 4:
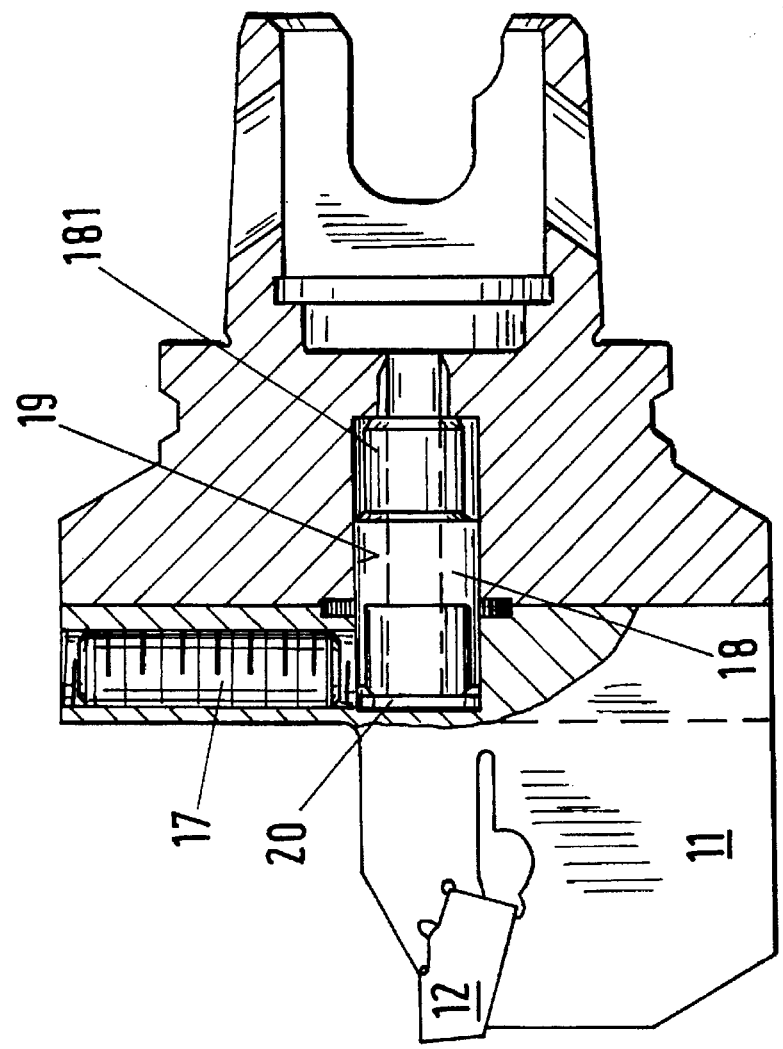

In the case when vertical adjustability of the cutting insert 12 or of the cutting-insert holder 11 can be dispensed with, the bolt 18 is withdrawn from the bore 19, is turned around 180° and inserted with its other end so that the bolt is snugly received in the bore 19 as well as in the bore 20. The adjustment screw 17 has of course previously been screwed with its front end out of the bore 20. In this position of the bolt 18 no vertical adjustment is possible. The front bolt end 181 is slightly smaller than the depth of the blind bore 20 and this length is substantially less than the remaining length of the bolt 18 which in the position shown in FIG. 4 must have with its larger diameter a sufficiently solid seat in the bores 19 and 20.

Figure 6A:
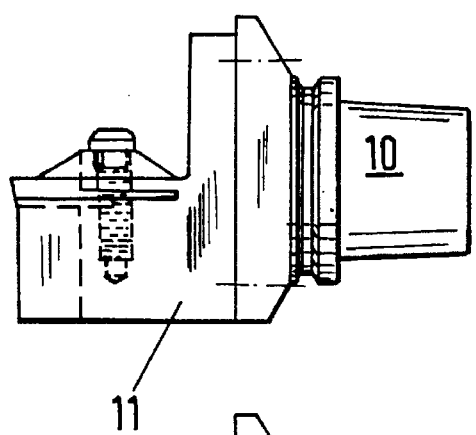
FIGS. 6a and 6b are side and end views of a first tool holder with a cutting-insert holder.
Figure 6B:
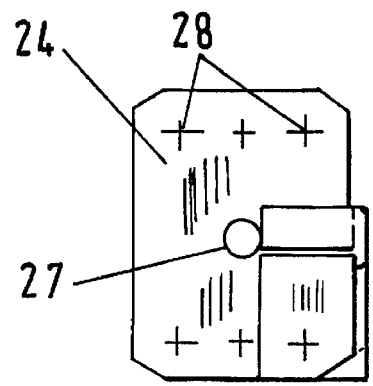
Figure 7A:
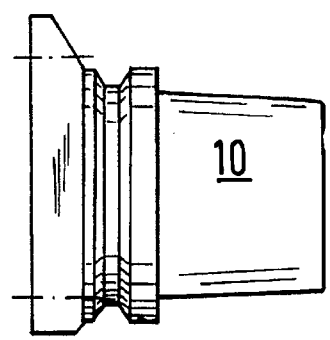
FIGS. 7a and 7b are corresponding views of a second tool holder of different size.
Figure 7B:
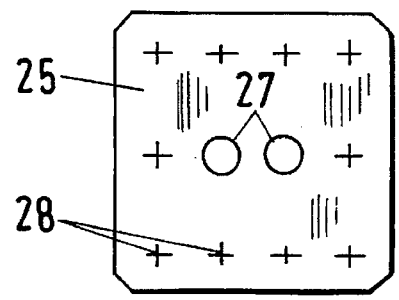
Figure 8A:
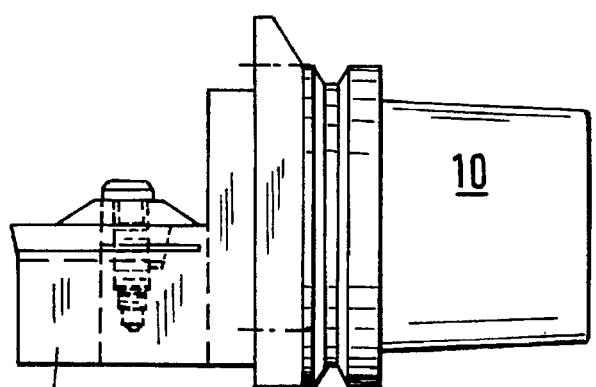
FIGS. 8a and 8b are corresponding views of a third tool holder with a cutting-insert holder.
Figure 8B:
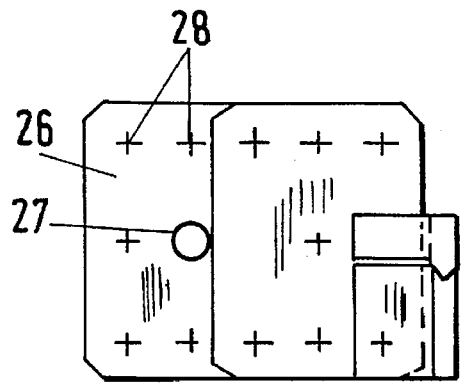

As shown in FIGS. 6b, 7b, and 8b the toothed support surface 24, 25, or 26 of the tool holder, on which the cutting-insert holder is secured by the mounting screws 15, has several threaded bores 28 whose number and arrangement on tool holders of different sizes and different types depend from the machining operation. Only a few of the threaded bores 28 are needed so that their positions are clearly set. One can distinguish between right- and left-hand cutting tools in that corresponding cutting-insert holders 11 can be clamped right or left. As seen in FIGS. 6a and 8a cutting-insert holders of different sizes and types can be used as well as different tool holders 10 with toothed support surfaces 24, 25, and 26 for whose threaded bores 28 the discussion with regard to FIGS. 6b, 7b, and 8b applies. It is for example possible to clamp a cutting-insert holder 11 according to FIG. 6a on a tool holder 10. FIGS. 7a and 8a show a possible centering or positioning which can be effected by centering bores 27 and bolts 18.

Figure 9A:
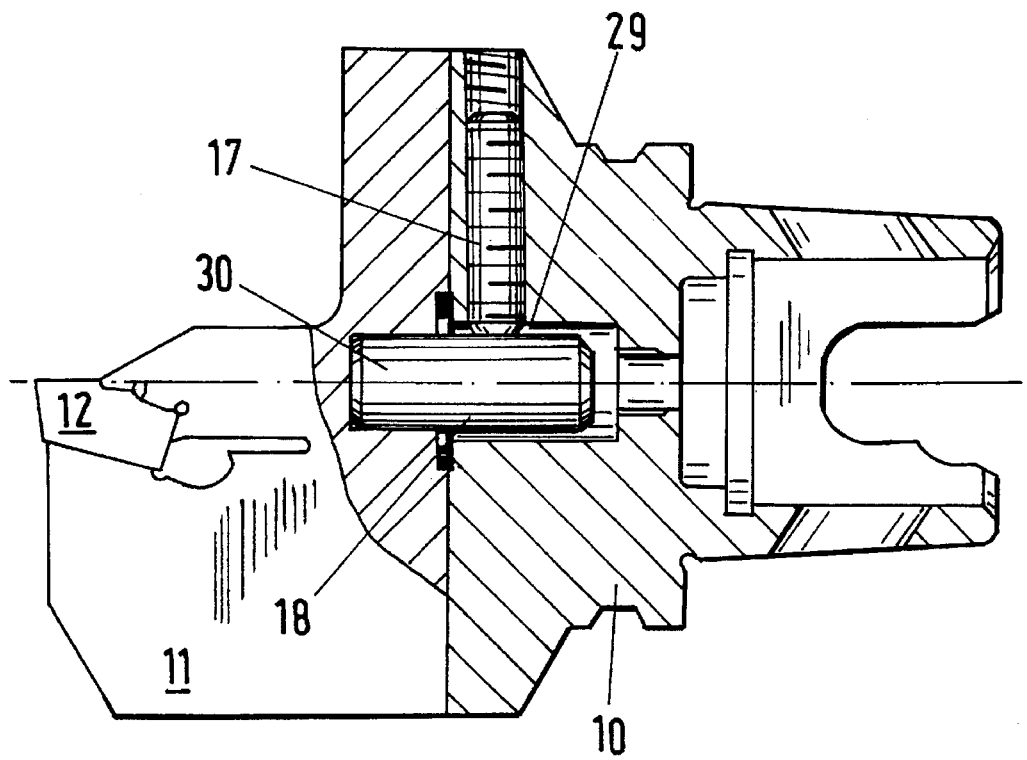
FIGS. 9a and 9b are corresponding views of a fourth tool holder with a cutting-insert holder.
Figure 9B:
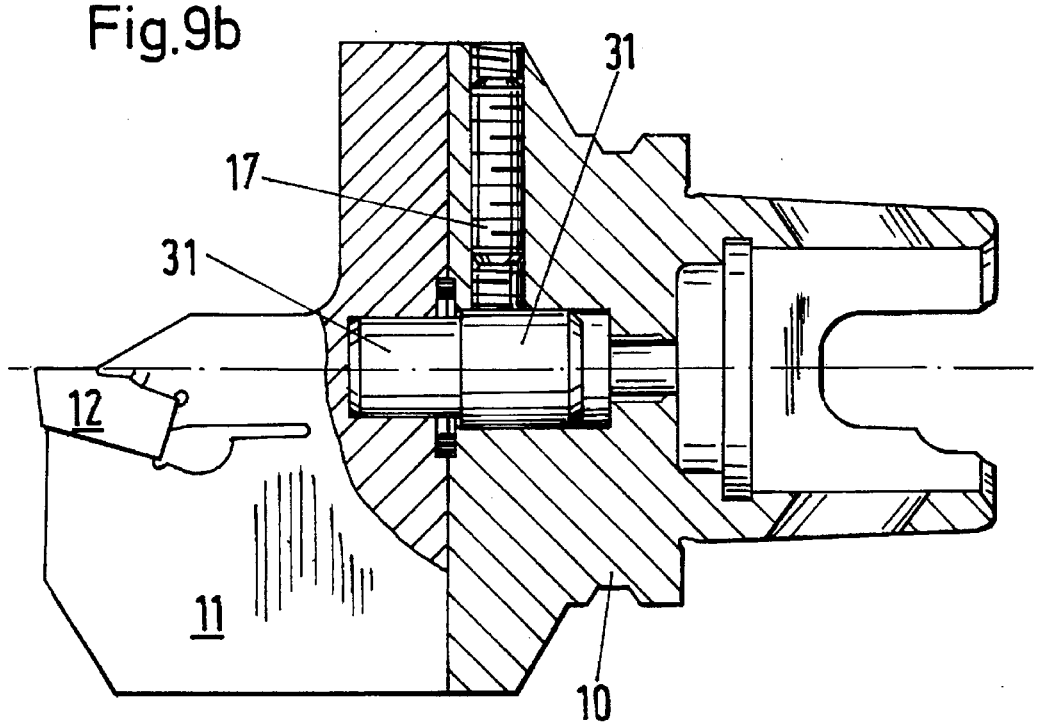

The embodiments according to FIGS. 9a and 9b are another two embodiments different from those described above in that the bolt is fixed in the cutting-insert holder and extends in the tool holder into a bore 29 whose diameter is larger than that of the cutting-insert holder bore. The first of another two embodiments shows the bolt 30 (FIG. 9a) which is cylindrical and formed with a constant diameter over its entire length. FIG. 9b illustrates the other embodiment according to the invention in which the bolt 31 has a smaller diameter corresponding to the cutting-insert holder diameter and a larger diameter so that the bolt fits snugly in the bore of the tool holder (10) (that is both holders 10 and 11 have dimensioned bores).

I claim:

1. A modular tool system comprising:

a first support having a first support face and formed with a first bore of a predetermined diameter opening at the face and defining a first axis;

a second support having a second support face and formed with a second bore of the predetermined diameter opening at the second face and defining a second axis, the two faces being engaged together with the bores opening into each other;

a machining tool mounted on one of the supports;

a bolt having a first end of the predetermined diameter and a second end of a diameter smaller than the predetermined diameter, the bolt being engageable in the bores in an adjustment position with its first end snugly fitted in the first bore and its second end loosely received in the second bore and in a centering position with its first end engaged snugly in both bores; and an adjustment screw threaded in the second support and bearing transversely of the axes on the second end of the bolt in the adjusting position thereof to transversely shift the second support on screwing of the screw in the second support.

2. The modular tool system defined in claim 1 wherein the second support is a clamping block for a tapping tool.

3. The modular tool system defined in claim 1 wherein the bolt and the second support are formed with interconnected coolant passages opening on the second support adjacent the tool, whereby a coolant can be fed through the passages to the tool.

4. The modular tool system defined in claim 1 wherein the surfaces are formed with interfitting teeth extending parallel to the screw.

5. The modular tool system defined in claim 1 wherein the second end is formed with a flat engageable in the adjusting position with the screw.

6. The modular tool system defined in claim 5 wherein the first end and the bores are cylindrical.

7. The modular tool system defined in claim 1 wherein the first end is substantially longer than the second end.

8. A modular tool system comprising:

a first support having a first support face and formed with a first cylindrical bore of a predetermined diameter opening at the face and defining a first axis perpendicular to the face;

a second support having a second support face and formed with a second cylindrical bore of the predetermined diameter opening at the second face and defining a second axis perpendicular to the second face, the two faces being complementarily engaged together with the bores opening into each other;

a machining tool mounted on one of the supports;

a bolt having a cylindrical first end of the predetermined diameter and a cylindrical second end of a diameter smaller than the predetermined diameter, said first cylindrical end being longer than said second cylindrical end, the bolt being engageable in the bores in an adjustment position with its first end snugly fitted in the first bore and its second end loosely received in the second bore and in a centering position with its first end engaged snugly in both bores; and an adjustment screw threaded in the second support and bearing transversely of the axes on the second end of the bolt in the adjusting position thereof to transversely shift the second support on screwing of the screw in second support.

9. A modular tool system comprising:

a first support having a first support face and formed with a first cylindrical bore of a predetermined diameter opening at the face and defining a first axis perpendicular to the face;

a second support having a second support face and formed with a second cylindrical bore of the predetermined diameter opening at the second face and defining a second axis perpendicular to the second face, the two faces being complementarily engaged together with the bores opening into each other;

a machining tool mounted on one of the supports;

a bolt having a cylindrical first end of the predetermined diameter and a cylindrical second end of a diameter smaller than the predetermined diameter, said first cylindrical end being longer than said second cylindrical end, the bolt being engageable in the bores in an adjustment position with its first end snugly fitted in the first bore and its second end loosely received in the second bore and in a centering position with its first end engaged snugly in both bores; and an adjustment screw threaded in the second support and bearing transversely of the axes on the second end of the bolt in the adjusting position thereof to transversely shift the second support on screwing of the screw in the second support.

10. A modular tool system comprising:

a first support having a first support face and formed with a first bore of a first predetermined diameter opening at the face and defining a first axis;

a second support having a second support face and formed with a second bore of a second diameter smaller than the first diameter opening at the second face and defining a second axis, the two faces being complementarily engaged together with the bores opening into each other;

a machining tool mounted on one of the supports;

a first bolt having a first end of the second diameter and a second end also of the second diameter, whereby in an adjustment position with the first end loosely received in the first bore and the second end is snugly received in the second bore the supports are relatively movable transversely of the axes;

a second bolt having a first end of the first diameter and a second end of the second diameter, whereby in a centering position with the second-bolt ends engaged snugly in the respective bores the supports are radially nondisplaceable relative to each other; and an adjustment screw threaded in the first support and bearing transversely of the axes on the first end of (the first bolt) in the adjusting position thereof to transversely shift the second support on screwing of the screw in the second support.

* * * * *